United States Patent [19]
Turrin et al.

[11] Patent Number: 5,097,687
[45] Date of Patent: Mar. 24, 1992

[54] RELEASABLE TOE STRAP FOR A BICYCLE PEDAL

[76] Inventors: David J. Turrin, P.O. Box 2073, Breckinridge, Colo. 80424; Michael J. Turrin, P.O. Box 1663, Telluride, Colo. 81435

[21] Appl. No.: 602,517
[22] Filed: Oct. 24, 1990
[51] Int. Cl.⁵ ............................................. G05G 1/14
[52] U.S. Cl. ................... 74/594.6; 24/576; 24/535; 36/131
[58] Field of Search ............... 24/576, 633, 535, 569; 74/594.4–594.6; 36/131

[56] References Cited

U.S. PATENT DOCUMENTS

| | | | |
|---|---|---|---|
| 3,842,688 | 10/1974 | Baginski | 74/594.6 |
| 4,327,602 | 5/1982 | Le Bec | 74/594.6 |
| 4,386,472 | 6/1983 | Shimano | 74/594.6 X |
| 4,455,721 | 6/1984 | Leibovitz | 24/535 X |
| 4,505,010 | 3/1985 | Arenhold | 74/535 X |
| 4,638,685 | 1/1987 | Cigolini | 74/594.6 |
| 4,944,072 | 7/1990 | Robson | 24/576 |

FOREIGN PATENT DOCUMENTS

| | | | |
|---|---|---|---|
| 0008266 | 2/1980 | European Pat. Off. | 74/594.6 |
| 2507561 | 12/1982 | France | 74/594.6 |
| 2578804 | 9/1986 | France | 74/594.6 |
| 22901 | 3/1962 | German Democratic Rep. | 24/576 |
| 312954 | 4/1956 | Switzerland | 24/576 |
| 2124165 | 2/1984 | United Kingdom | 74/594.6 |

Primary Examiner—Vinh T. Luong
Attorney, Agent, or Firm—Gary M. Polumbus

[57] ABSTRACT

A toe strap for use on a pedal of a bicycle includes a strap portion with a length-varying mechanism to adjust the length of the strap and a pressure-release connector adapted to interconnect opposite ends of the strap portion so that a bicyclist foot will be released from the pedal upon the application of a predetermined pressure. A bolt is provided on the pressure release connector with the effective length of the bolt being variable to vary the pressure required to affect a release of the connector.

4 Claims, 2 Drawing Sheets

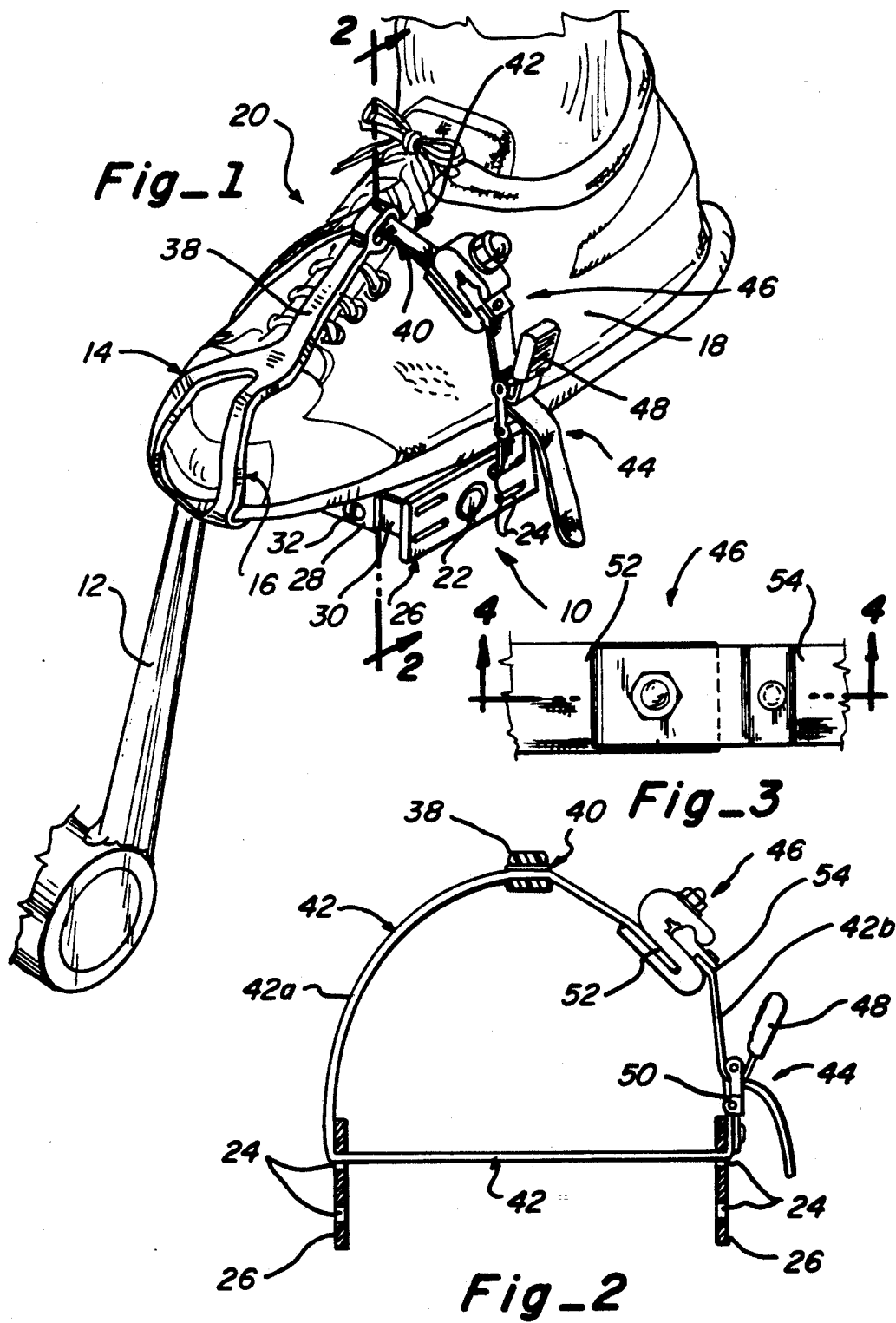

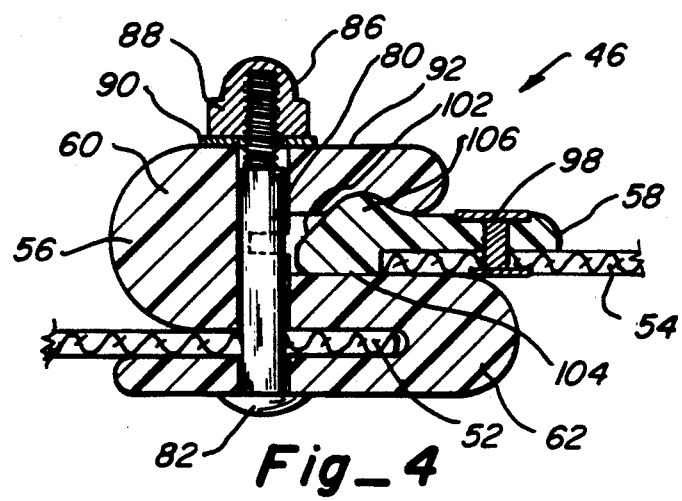
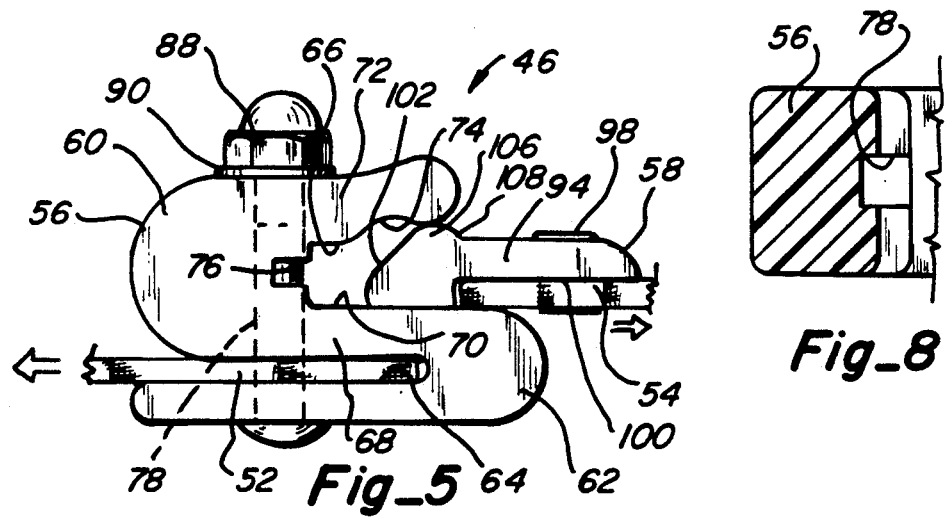
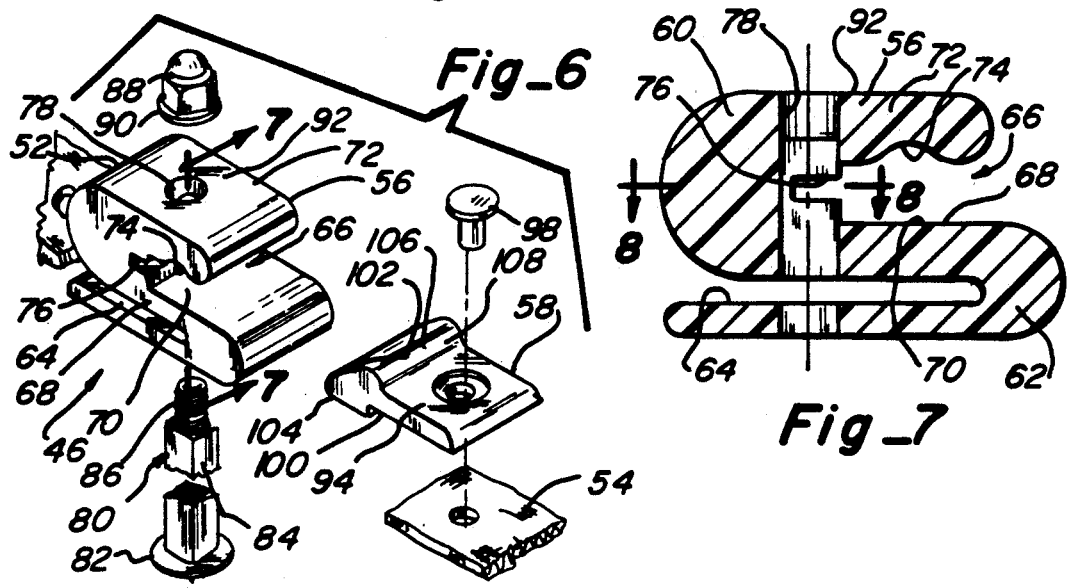

RELEASABLE TOE STRAP FOR A BICYCLE PEDAL

BACKGROUND OF THE INVENTION

1. Field of the Invention

The present invention relates generally to bicycle pedals and more particularly to a releasable toe strap for attachment to a bicycle pedal.

2. Description of the Prior Art

With the somewhat recent increased interest in bicycling and particularly competitive touring or off-road bicycling, it has become more important to positively but releasably retain an individual's foot on a bicycle pedal. One common means employed for retaining a bicyclist's foot on a pedal consists of a toe piece that is secured to the pedal along a front edge thereof so as to define to a rearwardly opening pocket into which the toe of the bicyclist's shoe can be inserted. Some toe pieces not only retain the foot of the bicyclist on the pedal and prevent it from sliding forwardly relative to the pedal, but also inhibit a lateral movement of the foot which is many times hazardous when the bicyclist is falling and needs to quickly remove his foot from the pedal.

More recent versions of toe pieces do not include lateral restraint features but rather include a toe strap which passes through the pedal and through an opening provided in the toe piece so that the strap assists in positively positioning the bicyclist's foot on the pedal. This arrangement, however, inhibits a quick removal of the foot from the pedal. For the same reasons mentioned previously, it is not always desirable to have the foot as permanently positioned on the pedal as some toe piece and straps systems effect, and accordingly, the current state of the art in systems for retaining a bicyclist's foot on a pedal are inherently dangerous. It is to overcome the shortcomings in the prior art that the present invention has been developed.

SUMMARY OF THE INVENTION

The present invention consists of a toe strap for a bicycle pedal that includes a pressure release connector interconnecting opposite ends of the toe strap so that upon application of a predetermined and preselected pressure to the toe strap, the foot of the bicyclist will be released from the pedal to which it otherwise is positively secured. As will be appreciated from the detailed description that follows, the toe strap can be used with or without a toe piece and is adapted to cooperate with the toe piece in the same manner as a conventional toe strap that does not include a pressure release feature.

The toe strap of the present invention is adjustable in length and includes at one end an anchor having a notch formed therein that is at least partially defined by a flexible arm. The anchor is made of a resilient material so that flexing movement of the arm permits a rigid head on the opposite end of the toe strap to be releasably retained in the notch. An elongated shaft member extends through the anchor with the effective length of the shaft being variable. The shaft is operatively associated with the flexible arm whereby variance in the effective length of the shaft effects the amount of pressure needed to permit the rigid head to be released from the notch in the anchor. Accordingly, not only is the toe strap of the present invention releasable to prevent danger to a bicyclist utilizing the toe strap, but the release system is adjustable for various individual likes and needs.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a perspective view of a bicyclist's foot on a pedal mounted on a crank arm and having a toe piece and a toe strap in accordance with the present invention connected thereto.

FIG. 2 is a section taken along line 2—2 of FIG. 1 with the foot of the bicyclist having been removed.

FIG. 3 is an enlarged top plan view of the pressure release connector with fragmented portions of the toe strap being connected thereto.

FIG. 4 is an enlarged section taken along line 4—4 of FIG. 3.

FIG. 5 is a fragmentary side view of the pressure release connector showing the rigid head component of the connector being removed from the anchor component of the connector.

FIG. 6 is an exploded fragmentary view showing the various component parts of the pressure release connector and the strap portion of the toe strap.

FIG. 7 is a section taken along line 7—7 of FIG. 6.

FIG. 8 is a section taken along line 8—8 of FIG. 7.

DESCRIPTION OF THE PREFERRED EMBODIMENT

With reference to FIG. 1, a conventional bicycle pedal 10 can be seen secured to a crank arm 12 of a bicycle (not shown) and wherein a conventional toe piece 14 is secured to the bike pedal to define a pocket 16 in which the forward portion of a foot 18 of the bicyclist can be inserted. The toe or securement strap 20 of the present invention is shown operatively connected to the pedal 10 and toe piece 14 in a manner to be described in more detail hereinafter.

The pedal 10 is mounted for rotative movement about a shaft 22 that is secured to and projects perpendicularly away from a distal end of the crank arm 12. The pedal is of hollow construction having strap retention means in the form of a plurality of slots 24 provided in opposite ends 26 through which the toe strap 20 can be threaded.

The toe piece 14 has an attachment plate 28 along a lower edge thereof with the attachment plate being securable to a front face 30 of the pedal 10 by screw-type fasteners 32. A forwardly projecting arm 34 extends perpendicularly away from the attachment plate 28 and is turned upwardly and rearwardly where it is bifurcated to define the pocket 16 to receive the forward portion of a bicyclist's foot before the bifurcated portion of the toe piece returns to a single arm 38 that is adapted to extend up the front part of the bicyclist's foot. At the uppermost extent of the single arm 38, an opening or passage 40 is provided through the toe piece 14 through which the toe strap 20 is threaded. In this manner, when the toe strap is secured and tightened onto the bicyclist's foot, it will draw the toe piece against the foot of the user to establish a relatively movement-free relationship between the bicyclist's foot and the pedal on which it is supported.

As will be appreciated from the description of the toe strap 20 that follows, the toe strap is adapted for use with a conventional toe piece 14 of the type illustrated to desirably secure a bicyclist's foot to the pedal but the toe strap could be used independently of such a toe piece with certain obvious and inherent limitations.

As probably best illustrated in FIGS. 1 and 2, the toe strap 20 of the present invention includes a pressure release connector 46 and an elongated strap portion 42 of nylon webbing, leather or the like having incorporated therein a conventional length varying mechanism 44 to vary the effective length of the toe strap dependent upon the size of the bicyclist's foot. The pressure release connector 46 is secured to opposite ends of the strap portion 42. The strap portion of the toe strap is actually severed at one location to form two pieces 42a and 42b which are interconnected by the length varying mechanism 44 with one end of one piece 42a of the strap being positively secured to the length varying mechanism and the other piece 42b of the strap portion being passed through the mechanism 44 so that the strap portion can be positively gripped by the mechanism at any one of an infinite number of positions along the length of the strap portion in a conventional manner. The length varying mechanism 44 disclosed includes a spring-biased lever arm 48 that urges the strap piece 42b against a fixed knurled anvil 50 but by pivotal movement of the arm 48 in a clockwise direction as viewed in FIG. 2, the arm releases the strap piece 42b so that it can be slid easily through the mechanism to vary the location along the length of the strap at which it is gripped. The lever arm 48 is spring biased in a counterclockwise direction so that upon release of the arm the strap piece 42b is again automatically gripped at a desired location.

Since the length varying mechanism 44 actually forms a part of the strap portion 42, it can be considered that the strap portion has a first end 52 and a second end 54 that are secured to component parts of the pressure release connector 46 to be described in detail hereinafter.

The pressure release connector 46 includes an anchor component 56 and a head component 58 with the head component adapted to be releasably retained by the anchor component, but wherein it can be released therefrom upon the application of a predetermined and preselected pressure applied to the strap portion 42 or the connector.

The anchor component 56, as is probably best illustrated in FIGS. 4 and 5, is of generally S-shaped cross section having a width substantially identical to the width of the strap portion 42 of the toe strap. The S-shaped configuration of the anchor component can be seen to define two oppositely directed generally C-shaped sections with one C-shaped section 60 being disposed on top of the other C-shaped section 62.

The lower C-shaped section 62 defines a very narrow horizontal slot 64 which opens in one direction and is adapted to receive the first end 52 of the strap portion 42. The upper C-shaped section 60 has a relatively wide notch 66 opening in the opposite direction and is adapted to receive the head component 58 of the connector to which the opposite or second end 54 of the strap portion is secured. The upper C-shaped section 60 is of thicker construction than the lower C-shaped section 62 and the entire anchor component 56 is made of a slightly flexible but resilient material that may be plastic, metal or the like.

The notch 66 in the upper C-shaped section is defined between a lower arm 68 having a flat upper surface 70 and an upper arm 72 that is adapted to flex slightly to permit the head component 58 of the connector to be inserted into the notch 66. The upper flexible arm 72 has a transverse arched recess 74 formed in the underside thereof to matingly receive a portion of the head component 58 as will be described in more detail later.

At the innermost extent of the relatively wide notch 66 in the upper C-shaped section, a relatively small groove 76 of rectangular cross section is provided that cooperates with a relatively large portion of the notch 66 in allowing desired flexing movement of the upper flexible arm 72. A vertical hole 78 is provided through the anchor component 56 so as to encompass the small groove 76 formed at the innermost extent of the notch 66 with the hole 78 having a square cross-section for approximately three-fourths of its length commencing at the bottom of the anchor and extending upwardly. The uppermost portion of the hole is of circular cross-section but having the same diameter as a side dimension of the square portion of the hole 78.

An elongated shaft or bolt 80 having an enlarged head 82, a square shank 84 along most of its length and a threaded terminal end 86 extends through the hole 78 and threadedly receives a nut 88 and washer 90 that abut an upper flat surface 92 of the anchor component. In this manner, it will be appreciated that by rotating the nut 88, the effective length of the bolt 80 can be varied to vary the amount of flex in the flexible arm. In other words, to limit the flex in the arm, the nut is threaded downwardly onto the bolt. To permit more flex, the nut is backed up the bolt. Of course, the square cross-section of the shank of the bolt mates with the square portion of the hole 78 to prevent the bolt from rotating when the nut is being rotated.

The head component 58 of the pressure release connector 46 has a relatively thin trailing end 94 to which the second end 54 of the strap portion 42 is secured by a rivet 98 that extends downwardly through the relatively thin trailing end 94 and the strap 42 in a conventional manner. A leading end of the rigid head component 58 is relatively large and bulbous so as to define a recess 100 in the rear portion of the head into which the second end 54 of the strap conformably fits. The leading end of the head component has a tapered upper surface 102 adapted to engage the free end of the flexible arm 72 to cause the arm to flex upwardly as the head component is slidably inserted into the relatively wide notch 66 in the upper C-shaped section 60 of the anchor component. A lower surface 104 of the leading end of the head component is flat so as to easily slide along the flat upper surface 70 of the lower arm 68 to permit easy insertion of the head into the notch 66. At the trailing end of the tapered upper surface 102, an arched laterally extending protuberance 106 is provided which projects upwardly and is adapted to mate with the recess 74 in the flexible arm when the head component is fully inserted into the notch 66.

It will be appreciated that as the head component 58 is slidably inserted into the notch 66, the tapered upper surface 102 cams the flexible arm 72 upwardly until the protuberance 106 passes into the recess 74 in the flexible arm (FIG. 5). At this time the resiliency in the flexible arm allows it to return to its normal position of FIG. 4 with the protuberance seated in the recess and the head component releasably retained by the anchor component. As will also be appreciated, the protuberance has a rounded back surface 108 corresponding to the tapered upper surface 102 of the head component so that when an axial pulling force is applied to the strap 42, the head component 58 will snap out of the notch 66 by camming the flexible arm 72 upwardly.

As mentioned previously, the flexibility of the flexible arm 72 can be varied by the effective length of the bolt 80 and in this manner the pressure required to insert or remove the head component 58 from the anchor component 56 of the pressure release connector 46 is infinitely variable. It should also be appreciated that the bolt when extending through the lower C-shaped section 62 of the anchor component extends through an opening (not seen) provided in the strap to positively secure and attach the first end 52 of the strap to the anchor component.

When attaching the toe strap 20 to a bicycle pedal 10, the first end 52 of the strap portion 42 (prior to being connected to the anchor component 56 of the pressure release connector) is threaded through a pair of the aligned slots 24 provided in the ends of the pedal 10 and subsequently in a reverse direction, the strap portion is threaded through the opening 40 in the toe piece 14, if the toe piece is being used. This is probably best seen by reference to FIG. 2. After the first end of the strap portion has been threaded through the toe piece, it is secured to the anchor component 56 of the connector 46 by inserting the first end of the strap portion into the relatively narrow slot 64 in the anchor component and subsequently extending the bolt 80 through the anchor component and the first end of the strap.

The second end 54 of the strap can be secured to the head component 58 of the connector 46 at any time and it should be pointed out that the head component is made of a relatively rigid material so as to desirably flex the arm 72 on the anchor component when inserting and releasing the head component from the anchor component.

As will be appreciated from the preceding description of the present invention, a toe strap has been described which is not only adjustable in length, and can be used with or without a toe piece, but also includes an adjustable pressure release connector to allow the toe strap to be released based upon the application of a preselected pressure which is determined by the effective length of the bolt component of the connector. The effective length of the bolt connector can be defined as extending from the enlarged head 82 of the bolt to the face of the washer 90 that is immediately beneath the nut 88.

Although the present invention has been described with a certain degree of particularity, it is understood that the present disclosure has been made by way of example, and changes in detail or structure may be made without departing from the spirit of the invention, as defined in the appended claims.

We claim:

1. A toe strap adapted to hold a biker's foot on a pedal of a bicycle where the pedal has strap retention means thereon, comprising in combination:
   a strap portion having first and second ends, said strap portion being operably connected to said pedal through the strap retention means, and
   a pressure release connector operably connected to said first and second ends of said strap portion, said pressure release connector being adapted to releasably retain said ends of the strap portion in a joined relationship and sever the joined relationship upon the application of a preselected pressure to the pressure release connector, said pressure release connector including a flexible and resilient anchor operably secured to said first end of the strap portion and a rigid head connected to said second end of the strap portion, said anchor including a flexible arm having a notch formed therein, said notch adapted to releasably receive and retain said head, and adjustment means forming a part of said anchor and at least partially determining the flexibility of said arm to regulate the amount of pressure needed to separate said head from the anchor, said adjustment means including an elongated shaft that is operatively connected to said flexible arm and wherein the effective length of the shaft is variable to adjust the degree to which the flexible arm is permitted to flex.

2. A toe strap adapted to hold a biker's foot on a pedal of a bicycle where the pedal has strap retention means thereon, comprising in combination:
   an elongated strap portion having first and second ends, said strap portion being operably connected to said pedal through the strap retention means, and
   a pressure release connector operably connected to said first and second ends of said strap portion, said pressure release connector being adapted to releasably retain said ends of the strap portion in a joined relationship and sever the joined relationship upon the application of a preselected pressure to the pressure release connector, said pressure release connector including a flexible and resilient anchor component and a rigid head component, said rigid head component being secured to said second end of the strap portion, said anchor component having a generally S-shaped cross section defining two oppositely directed C-shaped sections with one section being disposed below a second section, said one section having a slot therein receiving said one end of the strap portion and said second section including a notch therein adapted to releasably receive and retain said head component, said second section being at least partially defined by a flexible arm, and an elongated shaft the effective length of which is adjustable, said elongated shaft extending through said anchor to retain said first end of the strap portion in the anchor and to adjust the degree to which said flexible arm is permitted to flex.

3. The toe strap of claim 2 wherein said notch has a recess formed therein and said head component has a protuberance formed thereon, said protuberance being adapted to be matingly received in said recess to releasably retain the head component in the anchor component.

4. The toe strap of claim 2 wherein said elongated shaft is a threaded bolt and includes a nut whereby the effective length of the bolt can be varied by threaded movement of the nut.

* * * * *